(No Model.)
J. H. GOODFELLOW.
STORE SERVICE APPARATUS.
No. 541,743. Patented June 25, 1895.
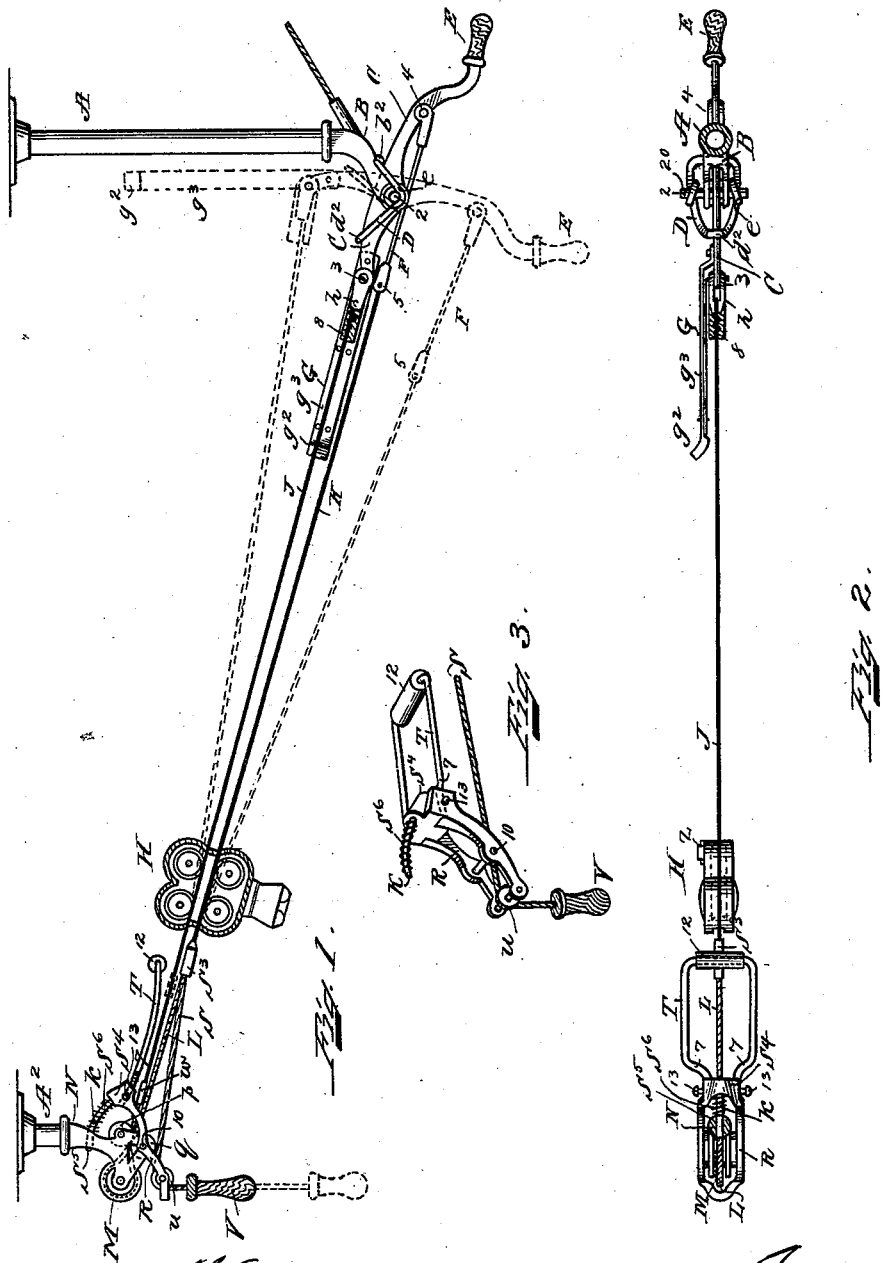

UNITED STATES PATENT OFFICE.

JOHN H. GOODFELLOW, OF LOWELL, ASSIGNOR TO THE LAMSON CONSOLIDATED STORE SERVICE COMPANY, OF BOSTON, MASSACHUSETTS.

STORE-SERVICE APPARATUS.

SPECIFICATION forming part of Letters Patent No. 541,743, dated June 25, 1895.

Application filed March 22, 1894. Serial No. 504,614. (No model.)

*To all whom it may concern:*

Be it known that I, JOHN H. GOODFELLOW, residing in the city of Lowell, county of Middlesex, and Commonwealth of Massachusetts, have invented certain new and useful Improvements in Store-Service Apparatus; and I do hereby declare that the following is a full, clear, and exact description of the invention, which will enable others skilled in the art to which it appertains to make and use the same.

One object of my invention is to provide means for automatically returning the lever and ways to their normal position after they have been operated to dispatch the carrier.

Another object is to provide means for operating the lever at the lower end of the way by flexible connections connected to the upper end of the way. These and other objects are accomplished by mechanisms hereinafter described and shown in the drawings.

My invention consists of certain novel features and combinations hereinafter described and shown in the drawings and particularly pointed out in the claims.

In the drawings accompanying this specification, Figure 1 represents a side elevation of my improved store service apparatus, showing in dotted lines the location of certain parts after the apparatus has been operated to dispatch the carrier to the upper end of the way. Fig. 2 is a top plan view of Fig. 1. Fig. 3 is a detail view of the mechanism at the cashier's end.

Like letters and numerals of reference refer to like parts throughout the several views.

The depending hollow standard A is attached to the ceiling, or other suitable place, in the store, and is provided at its lower end with a bifurcated bracket B, to which is pivoted the lever C by a shaft 2 passing through said bracket B and lever C. This shaft is so connected to the bracket and lever as to prevent lateral motion, but provides a pivot on which the lever is adapted to move, and has its ends 20 extending laterally beyond the sides of the bracket B sufficient to support a spring D. This spring D is so arranged that its coil $e$ has a pivot support upon the outer ends of the said shaft 2, and the loop $d^2$ rests upon the upper side of said lever C and its other end is made fast at $b^2$ to the bracket, as shown in Figs. 1 and 2. At equal distances from this pivot shaft 2 the lever C is provided with pivotal connections 3 and 4, and an operating handle E extends downward and outward from the rear pivotal connection 4. The connecting rod F extends from the pivot connection 4 on the under side of the lever C forward to the pivot connection 5, by which the lower track is supported, and in line vertically with the pivot 3 of the lever.

To the forward side portion of the lever C there is arranged a friction stop, guard or bracket G, which is constructed of spring or other suitable metal, and it extends from the lever C a distance equal to the length of the carrier in use. The forward end $g^2$ of the guard G is slightly deflected to one side, and the guard preferably is made flat, as shown, so as to press squarely against the side of the carrier.

If the track is constructed in a rigid manner, it is desirable to form the guard of spring metal, but when the track is made of wire the guard may be made of cast metal, the spring in the taut track wire being sufficient to provide yielding friction to hold the carrier. In order to increase the friction of the guard on the side of the carrier I provide it with a strip $g^3$ of hard rubber, or other equivalent. This strip may be secured to the side of the carrier by any suitable way so as to provide a frictional contact, or the carrier may be provided with a piece of hard rubber Z secured to its side, as shown in Fig. 2, so as to contact with the inside of the guard G after passing the deflecting end $g^2$.

To the pivot 3 of the lever C there is pivotally connected a bifurcated block $h$, and to the upper track wire J there is secured a rubber bumper 8 placed around the wire at its connection with the block $h$ (Figs. 1 and 2). The lower wire K is connected to the pivot end of the connecting rod F, as above stated. Both these track wires J and K have their upper ends connected to flexible extension L, which is supported by pulley M mounted in the outer end of the bifurcated bracket N, which is supported by a hollow standard $A^2$ depending from the ceiling over the cashier's desk.

A grooved pulley $p$ is mounted on and in front of the bracket N in such a position as to bear upon the flexible portion L of the track J and holds it down close to the end portion of the flexible connection passing around the pulley M, and $q$ is another pulley arranged upon the same bracket N so as to bear up against the under side of the flexible portion L; although I find in practice that it is not absolutely necessary as the upper pulley is sufficient.

In Fig. 3 there is shown in perspective the tilting frame R, and its fulcrum pivot 10 is upon the bracket N in such a position as to supply the bearings for the pulley $p$, or $q$ as desired, and as shown is located at $q$. The rear portion is provided with a grooved pulley $u$ mounted thereon, over which the operating cord S passes and extends downwardly therefrom, and the free end of which is provided with a suitable handle V. The other end of this cord is fastened to the clip $S^3$, which also securely holds the track wire K and is constructed of such a size as to pass freely between the wheels of the carrier. The upper end of the tilting frame is provided with a head or block $S^4$, which, when in position, will be supported above the flexible extension L.

The curved rod $k$ has its lower end cast, or otherwise secured, in the block $S^4$, and its free end is adapted to pass through a hole $S^5$ in the bracket N. A spring $S^6$ on the rod is interposed between the block and the bracket and furnishes the means for maintaining the tilting frame R in its normal position, as shown, at the upper end of the apparatus.

The yielding stop T is made of wire and its outer end is provided with a piece of rubber tubing 12. The other ends 7 of the wire forming the stop T are secured in holes made in the block $S^4$, and set screws 13 are arranged to hold them in desired positions.

W is a metallic clip which connects the upper end of the flexible extension L to the track J. The carrier H is constructed with a double set of wheels, between the upper and lower sets of which the wires J and K are adapted to pass.

The operation of the apparatus is substantially as follows: Supposing the carrier to be approaching the lower end of the way, composed of the wires J and K then the rubber block Z on the carrier will contact with the deflecting end $g^2$ of the guard G and spring the track to one side, and in the further movement of the carrier the friction becomes so great that the carrier is brought to a stop without noise or shock as it contacts with the buffer 8. Now in order to dispatch the carrier from the salesman's end up the inclined way to the cashier's desk the lever C is moved to the position shown in dotted lines, which lifts the guard G away from the carrier in the arc of a circle and the carrier by reason of the leverage created by the wheels and the track wires J and K is impelled up the way to the cashier's desk. This movement of lever C and track wires J and K causes the flexible extension L to move around the pulley M and also moves the clips W and $S^3$ toward each other. The carrier H upon reaching the upper end of the way lifts the stop T, and the roller 12 is forced down in front of the carrier by the spring $k$ and thus holds the carrier at the upper end of the way. After the lever is released the spring D will return the lever and ways to their normal positions, as shown in full lines. If the clerk should undertake to return the carrier to himself he could not do so for the reason that the stop T at the upper end of the way holds the carrier and is entirely independent of his control, but if the cashier desires to return the carrier to the salesman he merely pulls on the handle V, which will cause the tilting frame R to tilt on its pivot 10 thereby overcoming the spring $k$, and the stop T is lifted from in front of the carrier, whereby the carrier starts down the incline by gravity. The cashier may also return the carrier to himself from the lower end of the way by pulling the handle V to its full lower limit and holding it, which will cause the lever and the wires to assume the positions shown in dotted lines, Fig. 1, whereby the carrier is impelled up the way to the cashier's end.

I do not limit myself to the exact arrangements and constructions shown as the same may be varied without departing from the spirit of my invention.

Having thus ascertained the nature and set forth the construction of my invention, what I claim as new, and desire to secure by Letters Patent of the United States, is—

1. In a store service apparatus, an inclined way upon which a carrier is adapted to travel, a pivoted lever at the lower end of the way supporting a pair of pivot connections equidistant from the pivot of the lever and to which the lower ends of the way are secured, a pulley at the upper end of the way and a flexible connection supported by said pulley and to which the upper ends of said way are secured.

2. In a store service apparatus, an inclined way upon which a carrier is adapted to travel, a pivoted lever at the lower end of the way supporting a pair of pivot connections equidistant from the pivot of the lever and to which the lower ends of the way are secured, a pulley at the upper end of the way, a flexible connection supported by said pulley and to which the upper ends of said way are secured, a stop at the upper end of the way, and a spring for holding it down in front of the carrier.

3. In a store service apparatus, an inclined way upon which a carrier is adapted to travel, a pivoted lever at the lower end of the way supporting a pair of pivot connections equidistant from the pivot of the lever and to which the lower ends of the way are secured, a pulley at the upper end of the way, a flexible connection supported by said pulley and to which the upper ends of said way are secured, and a spring at the lower end of the way for returning said pivoted lever to its normal position after being operated.

4. In a store service apparatus, an inclined way upon which a carrier is adapted to travel, a pivoted lever at the lower end of the way supporting a pair of pivot connections equidistant from the pivot of the lever and to which the lower ends of the way are secured, a pulley at the upper end of the way, a flexible connection supported by said pulley and to which the upper ends of said way are secured, and a spring controlled stop at the upper end of the way to hold the carrier, and a stop at the lower end of the way connected to and moved by the said pivoted lever.

5. In a store service apparatus, an inclined way upon which a carrier is adapted to travel, a pivoted lever at the lower end of the way supporting a pair of pivot connections equidistant from the pivot of the lever and to which the lower ends of the way are secured, a pulley at the upper end of the way, a flexible connection supported by said pulley and to which the upper ends of said way are secured, a tilting frame pivotally mounted at the upper end of the way, and an operating cord supported by said tilting frame and adapted, when operated, to release the carrier from the upper end of the way.

6. In a store service apparatus, an inclined way upon which a carrier is adapted to travel, a pivoted lever at the lower end of the way supporting a pair of pivot connections equidistant from the pivot of the lever and to which the lower ends of the way are secured, a pulley at the upper end of the way, a flexible connection supported by said pulley and to which the upper ends of said way are secured, a spring controlled tilting frame pivotally mounted at the upper end of the way, and an operating cord supported by said tilting frame and adapted, when operated, to release the carrier from the upper end of the way.

In testimony whereof I have signed my name to this specification, in the presence of two subscribing witnesses, on this 16th day of February, 1894.

JOHN H. GOODFELLOW.

Witnesses:
ETTA COURTNEY,
SAML. E. KIMBALL.